(No Model.)
T. BROADBENT.
PEDAL FOR VELOCIPEDES.
No. 508,562. Patented Nov. 14, 1893.
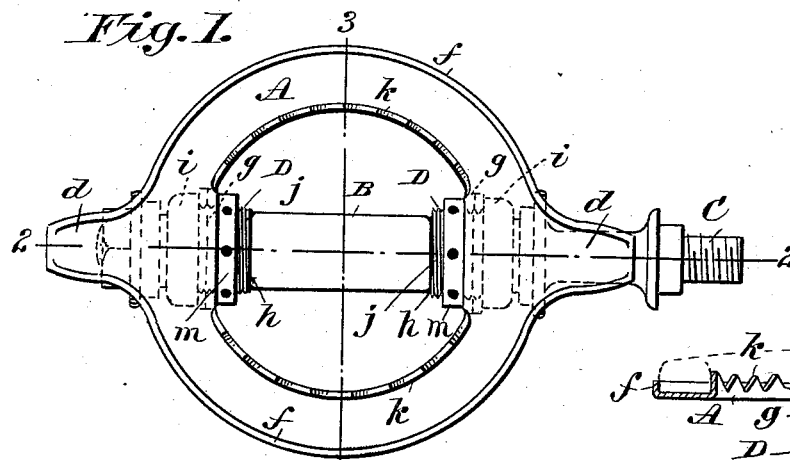
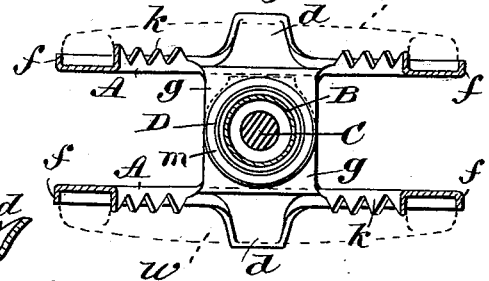
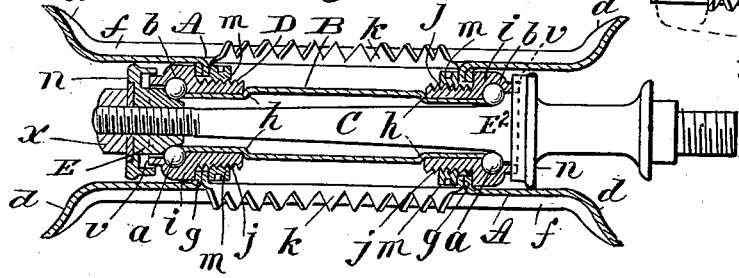
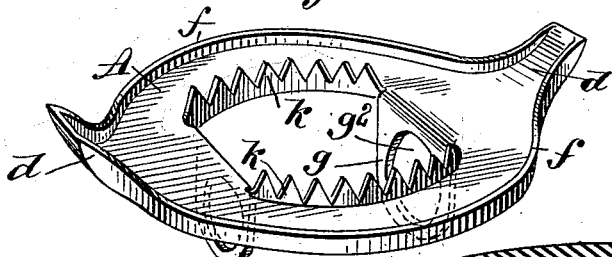
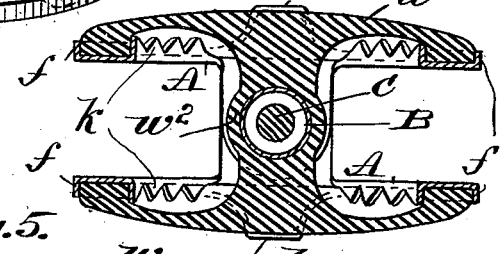
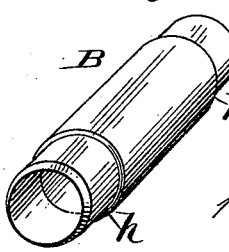
Witnesses:
J. A. Garfield
K. A. Clemons
Inventor,
Thomas Broadbent,
per Chapin & Co., Attys.

UNITED STATES PATENT OFFICE.

THOMAS BROADBENT, OF WORCESTER, MASSACHUSETTS.

PEDAL FOR VELOCIPEDES.

SPECIFICATION forming part of Letters Patent No. 508,562, dated November 14, 1893.

Application filed March 23, 1893. Serial No. 467,236. (No model.)

*To all whom it may concern:*

Be it known that I, THOMAS BROADBENT, a citizen of the United States, residing at Worcester, in the county of Worcester and State of Massachusetts, have invented new and useful Improvements in Pedals for Velocipedes, of which the following is a specification.

The object of this invention is to produce a pedal which is very light, yet durable, extremely cheap and practicable of construction admitting largely the utilization of sheet steel or other suitable thin metal, and which by reason of its form is most convenient and satisfactory to the rider, it being primarily a rat-trap pedal, but easily convertible into a pedal having foot bearings of rubber or cork; and the invention consists in a pedal constructed all as will hereinafter fully appear and be set forth in the claims.

This improved pedal is illustrated in the accompanying drawings, in which—

Figure 1 is a plan view, Figs. 2 and 3 being sections on lines 2—2, and 3—3, respectively, of Fig. 1. Fig. 4 is a perspective view of one of the foot bearings. Fig. 5 is a perspective view of the tubular center on the body of the pedal. Fig. 6 is a cross sectional view of the pedal with the rubber foot bearing applied thereon.

Similar characters of reference indicate corresponding parts in all of the views.

In the drawings, A A represent the opposed foot-bearing plates, B the tubular pedal-body and C the pedal-shaft.

D D are sleeves which are comprised as parts of the pedal and each forms one member of the ball-bearing at each end of the pedal, coacting with which are the cones, E, $E^2$,—the latter one, $E^2$, formed as a part of the shaft and the other having a screw-engagement with the shaft between which cones and the sleeves the hardened balls, $a, a$, are placed, each sleeve having the ball-groove, $b$, therein.

The bearing plates, A, are preferably round, or approximately that shape, and each is formed preferably of thin steel, with the integrally formed oppositely extended wings, $d$, $d$, which are turned outwardly from the general plane of the plate to form the guards for preventing the lateral displacement of the foot from the pedal. The plate has the integral and continuous upturned lip, $f$, which surrounds the plate proper and also, practically, the guard-wings, $d$. The plate also has internal portions thereof, which are suitably slitted therefor, inwardly turned in the ears, $g, g;$ these ears being perforated, as seen at $g^2$, to surround the tubular body of the pedal, or, strictly speaking, the aforesaid sleeves, D, D. These sleeves are fitted upon the extremities of the tubular pedal-body, B, which end portions are indicated as of reduced diameter whereby the shoulders, $h$, are formed; these shoulders prevent the undue endwise shifting of the sleeves upon the tubular pedal body.

The ends of the tube protrude slightly within the inner borders of the ball-grooves, $b, b$, as seen in Fig. 2, the distance between such protruding end and the outer boundary of the groove being slightly less than the diameter of the balls, and the arrangement is, therefore, such that more than half of the bulk of the balls is within the space which is bounded outwardly by the outer edge of the groove, $b$, and inwardly by the end of the tube.

In practice the end of the tube does not constitute a part of the ball-race, the bearing upon the balls being by the groove-wall, and the cone, but the end of the tube serves to prevent the accidental displacement of the balls on various occasions,—for example, during the assemblage of the parts, or when the pedal is removed from the pedal-shaft.

Each sleeve, D, is externally shouldered, as seen at $i$, and externally screw-threaded from said shoulder toward its inner end, as seen at $j$. The perforated ears, $g, g$, of the foot-plates are in the embrace of the said sleeves, D D, in contact, the one end ear of the one-side foot-plate with the corresponding ear of the other side foot-plate, both being firmly bound against the shoulder, $i$, by the ring-nut, $m$. It will be noted, by the dotted lines in Fig. 3, which represent the squared form of ends for the lips, $g$, of one of the foot-plates that it lies next to the under side of the opposite foot-plate, and prevents any tilting of the one plate independently of the other. Internal portions of each foot-plate are upturned and serrated to constitute the toothed bearing-lips, $k$, for the rat-trap pedal. These are preferably, as shown, arranged in arc lines parallel with the forward and rear lip-formed boundaries of the bearing plate.

It will be apparent, on taking note of the form of bearing-plate, shown in Fig. 1, that by reason of its thin sheet metal formation and the removal of large internal portions of its area, (it being an apertured disk, or an annulus) the bearing members of the pedal are very light, they being rendered very strong, however, by the border rib, $f$, as well, also, as by the inner serrated lips; and the guard-wings, $d$, $d$, materially, in this pedal, augment its capability of withstanding bending strains along a line parallel with the shaft at which considerable bending tendency is brought in the use of the pedal. The tubular body, B, is also a very thin shell, little or no strain coming thereon, and while the sleeves, D, and removable cone, E, are substantially formed with suitable width of stock wherever needed, these parts do not perceptibly add to the weight of the pedal.

Each of the sleeves, D, has its outer extremity in the form of an annular flange, $v$, while back of the base of each of the cones, E, $E^2$, is a groove, $n$, within which, when the cones are drawn to their proper proximity to the ball-grooves, $b$, $b$, said annular flange extremities are inclosed, the outer walls of the said grooves serving efficiently as the dust-guards for the ball-bearings.

The mode of assemblage of the parts will be now set forth. One sleeve, D, is applied on the one necked-down extremity of the tubular-body, B, and the bearing-plates are brought into their opposed relations with their perforated ear-pieces in contact, and these ear-pieces are slipped over the tube, the pair at one end being, of course, carried against the shoulder of the sleeve, D, and the nut for that sleeve is then applied; the ring-nut for the other sleeve is placed upon the middle of the tube and the second sleeve, D, is next placed about the other extremity of the tube, its screw-threaded portion being extended through and within the ear-lugs of the foot-plates and the ring-nut is then brought to place and screwed on the sleeve, binding the ear-lugs against the sleeve-shoulder; the pedal may now be placed on the pedal-shaft and the adjustable cone for the ball-bearings applied, and the lock-nut, $x$, screwed upon the end of the shaft. In the assemblage it will be understood that the balls are placed in the grooves of the sleeves, D, just before the sleeves are forced fully against the shoulders, $h$, of the tube. Rubbers, or other yielding foot-bearing sections, may be provided for the foot-plates. As indicated by the dotted lines in Fig. 2 these may consist of rings (or segments) of rubber, or cork or analogous material set in the groove between the outer lips, $f$, and the serrated lips, $k$, being retained by cement, screws, or otherwise. The rubber for each bearing plate may, as indicated in Fig. 6, be in the form of a disk, $w$, of suitable size to cover the plate with the depending neck with tubular extremity, $w^2$, which may surround the tubular body, B.

I have in another application for a patent for improvements in pedals, filed by me July 13, 1893, Serial No. 480,325, more fully described and claimed improvements in the pedal so far as they consist in the combination with the circular and centrally apertured foot-bearing-part of a layer of rubber supported by said foot-bearing part.

Having thus described my invention, what I claim, and desire to secure by Letters Patent, is—

1. A pedal consisting of upper and lower bearing-plates each having an internal portion thereof upset and serrated, and the intermediate body to which said plates are connected, substantially as described.

2. In a pedal, a foot-bearing-plate of substantially circular form, having internal portions thereof inturned angularly to the general plane of the said plate, and a tubular pedal body, and sleeves for forming bearings at the ends of the pedal detachably connected to the ends of said tubular body, with which sleeves the angular members of the bearing plates have detachable engagements, substantially as described.

3. In a pedal the combination with the tube, the sleeve externally shouldered and having a portion externally screw-threaded, fixed upon the extremity of the tube, with the portion extending beyond the tube-end internally formed to constitute a member of the ball-bearing, the opposing foot-bearing plates with the underturned apertured ear-pieces fitted over the sleeve next to the shoulder, and the nut engaging the threaded portion of the sleeve, and exerting a binding action upon the said ear-pieces, substantially as described.

4. In a pedal in combination, the tube with the end portions of contracted diameter, the sleeve with the ball-groove peripherally therewithin, secured by a portion of its length upon the contracted part of the tube and so arranged that the extremity of the tube lies within the ball-groove, the pair of plates each having the underturned ear-lugs fitted over and confined upon the sleeve, the threaded shaft, the cone screwing thereon and the balls, substantially as described.

5. In a pedal, the body or middle support comprising a sleeve with the ball-groove and the tube having its extremity fitted within and through a portion of the length of the sleeve, its end protruding slightly within the ball-groove for the purpose set forth, the shaft, and the cone screwing onto the shaft between which and the wall of the groove are the balls, substantially as and for the purposes set forth.

6. A pedal having a metallic foot-bearing-plate with the angularly and apertured ear-lugs, in combination with separate ball-bearing sleeves which have shoulders and necked-down screw-threaded portions which are passed through said apertured ear-lugs, and the nuts screwing upon said necked-down portions of the sleeves against said lugs, substantially as described.

7. In a pedal in combination, the tubular body with necked-down extremities, the sleeves, D, with shouldered and screw-threaded portions and the ball-grooves, the foot-bearing plates centrally apertured with the oppositely extended and upturned guard-wings, upturned border-lips, the inner upturned serrated lips, and the underturned perforated ear-lugs which embrace the sleeves, and the ring-nuts, all as described and shown.

8. The tubular body, the sleeves having ball grooves near their ends and by portions of their lengths fitted on the extremities of the tubular body, so that portions of said body protrude across the inner edge of the groove, a foot bearing plate lying alongside the tubular body and having angularly extended lugs or members which are secured to said sleeves and serve to retain them against endwise displacement from the tubular body, substantially as described.

9. In a pedal for velocipedes, the combination with a body of tubular or cylindrical form, of a centrally apertured plate above or alongside and parallel with the body, and a thickness of rubber supported by said plate and having a depending and apertured neck which extends within the aperture of the plate and embraces the pedal-body, substantially as described.

10. A pedal having its metallic foot-bearing-plate formed with opposite internal portions underturned in lugs, internal portions between the said lugs upturned, and the marginal portions of the plate also upturned to form a strengthening lip, substantially as described.

THOMAS BROADBENT.

Witnesses:
WM. S. BELLOWS,
J. D. GARFIELD.